(12) United States Patent
Smith (10) Patent No.: US 10,290,026 B2
(45) Date of Patent: *May 14, 2019

(54) ADVERTISEMENT SNAPSHOT RECORDER

(71) Applicant: Amboee, Inc., Redwood City, CA (US)

(72) Inventor: Douglas Smith, Orinda, CA (US)

(73) Assignee: Amobee, Inc., Redwood City, CA (US)

( * ) Notice: Subject to any disclaimer, the term of this patent is extended or adjusted under 35 U.S.C. 154(b) by 283 days.

This patent is subject to a terminal disclaimer.

(21) Appl. No.: 15/398,889

(22) Filed: Jan. 5, 2017

(65) Prior Publication Data

US 2017/0116646 A1 Apr. 27, 2017

Related U.S. Application Data

(63) Continuation of application No. 14/332,425, filed on Jul. 16, 2014, now Pat. No. 9,563,905.

(51) Int. Cl.
*G06Q 30/00* (2012.01)
*G06Q 30/02* (2012.01)

(52) U.S. Cl.
CPC ..... *G06Q 30/0275* (2013.01); *G06Q 30/0246* (2013.01); *G06Q 30/0276* (2013.01); *G06Q 30/0277* (2013.01)

(58) Field of Classification Search
CPC ........................................ G06Q 30/00–30/0284
USPC .............................................. 705/14.1–14.73
See application file for complete search history.

(56) References Cited

U.S. PATENT DOCUMENTS

| | | | | |
|---|---|---|---|---|
| 6,285,987 B1* | 9/2001 | Roth | ...................... | G06Q 30/02 705/14.66 |
| 6,324,519 B1* | 11/2001 | Eldering | ................ | G06Q 30/02 705/14.65 |
| 2008/0052140 A1* | 2/2008 | Neal | ...................... | G06Q 30/02 705/1.1 |
| 2008/0294519 A1* | 11/2008 | Warwick | ................ | G06Q 30/02 705/14.54 |
| 2015/0199731 A1* | 7/2015 | Jevtic | ................. | G06Q 30/0243 705/14.73 |
| 2015/0339702 A1* | 11/2015 | Lin | .................... | G06Q 30/0246 705/14.45 |

(Continued)

OTHER PUBLICATIONS

Guha, Cheng & Francis, "Challenges in measuring online advertising systems", Nov. 2010, Proceeding of the 10th ACM SIGCOMM conference on Internet measurement, pp. 81-87 (Year: 2010).*

(Continued)

*Primary Examiner* — John Van Bramer
(74) *Attorney, Agent, or Firm* — Kwan & Olynick LLP (57) ABSTRACT

According to various embodiments, techniques and mechanisms described herein facilitate the storage of an image of a rendered webpage on a storage medium. A first message including a request for a webpage may be transmitted to a web server via a communications interface. The webpage request may generate an advertising opportunity bid request for bids to place an advertisement on the requested webpage. A second message to place a bid on the generated advertising opportunity bid request may be transmitted. Information for rendering the webpage is received in response to the webpage request, and an image of the rendered webpage may be stored on a storage medium.

20 Claims, 7 Drawing Sheets

(56) References Cited

U.S. PATENT DOCUMENTS

2016/0019597 A1  1/2016  Smith

OTHER PUBLICATIONS

"U.S. Appl. No. 14/332,425, Final Office Action dated Mar. 17, 2015", 12 pages.
"U.S. Appl. No. 14/332,425, Final Office Action dated Aug. 11, 2016", 8 pages.
"U.S. Appl. No. 14/332,425, Non Final Office Action dated Oct. 27, 2014", 10 pages.
"U.S. Appl. No. 14/332,425, Non Final Office Action dated Dec. 21, 2015", 10 pages.
"U.S. Appl. No. 14/332,425, Notice of Allowance dated Sep. 26, 2016", 9 pages.

* cited by examiner

ADVERTISEMENT SNAPSHOT RECORDER

CROSS-REFERENCE TO RELATED APPLICATIONS

This application is a continuation of and claims benefit under 35 U.S.C. § 120 to U.S. application Ser. No. 14/332,425, filed Jul. 16, 2014 by Douglas Smith, which is herein incorporated by reference for all purposes.

TECHNICAL FIELD

The present disclosure relates generally to online advertising campaign management and more specifically to the collection and presentation of images of online advertisements as presented to client devices.

DESCRIPTION OF RELATED ART

In online advertising, computing device users are presented with advertisements as they browse the internet using a web browser or use web-enabled applications. Online advertising is an efficient way for advertisers to convey advertising information to potential purchasers of goods and services. It is also an efficient tool for non-profit/political organizations to increase the awareness in a target group of people. The presentation of an advertisement to a single internet user is referred to as an ad impression.

Billions of display ad impressions are presented on a daily basis. Advertisers often try to use ad impressions to reach as many targeted users as possible. Advertisers may seek an advertiser-specific action from advertisement viewers. For instance, an advertiser may seek to have an advertisement viewer purchase a product, fill out a form, sign up for e-mails, and/or perform some other type of action. An action desired by the advertiser may also be referred to as a conversion.

After an advertising campaign is configured, advertisements associated with the campaign may be placed in potentially many different contexts. For example, an advertisement may be placed in many potentially many different webpages on potentially many different websites. As another example, an advertisement may be placed in many different presentations of potentially many different web-enabled applications.

SUMMARY

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In general, certain embodiments of the present invention provide mechanisms for storing an image of a rendered webpage including an advertisement on a storage medium. A first message including a request for a webpage may be transmitted to a web server via a communications interface. The webpage request may generate an advertising opportunity bid request for bids to place an advertisement on the requested webpage. A second message to place a bid on the generated advertising opportunity bid request may be transmitted. Information for rendering the webpage is received in response to the webpage request, and an image of the rendered webpage may be stored on a storage medium.

According to various embodiments, a third message including the image of the rendered webpage for presentation may be transmitted to a client device. The third message may include analytics information characterizing web traffic associated with the requested webpage.

In particular embodiments, a third message including an advertisement for placement in the requested webpage may be transmitted when the placed bid is successful. The rendered webpage image may include a first portion generated based on instructions provided by the web server and a second portion generated based on an advertisement transmitted by the computing system.

According to various embodiments, the image of the rendered webpage may be collected in accordance with online advertising campaign configuration instructions that include one or more parameter values for executing an online advertising campaign on behalf of an advertiser. The online advertising campaign configuration instructions may include a first instruction designating the requested webpage for rendered webpage collection. The first instruction may indicate a frequency for collecting images of the requested webpage.

In some implementations, the second message may be transmitted to a real time bid exchange operable to present online advertisement inventory for sale on a per-impression basis.

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular techniques and mechanisms related to advertising campaigns. However, it should be noted that the techniques and mechanisms of the present invention apply to a variety of different computing techniques and mechanisms. In the following description, numerous specific details are set forth in order to provide a thorough understanding of the present invention. Particular example embodiments of the present invention may be implemented without some or all of these specific details. In other instances, well known process operations have not been described in detail so as not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

According to various embodiments, techniques and mechanisms described herein may facilitate the capturing and manipulation of images of digital advertisements presented in webpages as part of online advertisement campaigns. An advertising campaign management system may be configured to manage an online advertising campaign by submitting bids on advertising opportunity bid requests in order to place advertisements on webpages provided to client devices. In some instances, the advertising campaign management system may also act as a client device in order to collect a snapshot of an advertisement as it is actually rendered in a webpage as a client device. For example, the system may first act as a client device to request a webpage, which may generate a request for advertisers to bid for placing an advertisement on the webpage provided in response to the request. Then, the system may submit a bid to place an advertisement on the webpage that it requested. When the system wins the bid, the system provides the advertisement for placement on the webpage. Then, the system acting as the client device receives the requested webpage with the advertisement that it provided for placement. The system may then render the webpage and record an image of the rendered page for presentation in a user interface.

Example Embodiments

In recent years, the amount of ad impressions sold through real time bidding (RTB) exchanges has experienced a tremendous growth. RTB exchanges provide a technology for advertisers to algorithmically place a bid on any individual impression through a public auction. This functionality allows advertisers to buy inventory in a cost effective manner and to serve ads to the right person in the right context at the right time. However, in order to realize such functionality, advertisers need to intelligently evaluate each impression in real time or near real time. Demand-side platforms (DSPs) provide real time bid optimization techniques to help advertisers determine a bid value for each ad request very quickly. For instance, a DSP may determine a bid value in milliseconds for close to a million bids per second.

In order to use the services of a DSP, an advertiser may specify one or more parameters for an advertising campaign. The advertising campaign may include features such as a target audience, one or more budget restrictions, and one or more advertisements to serve. A budget restriction may designate an amount of money that the DSP may and/or should spend on the purchase of advertising impressions during the execution of the advertising campaign. The advertisements may include creative artwork such as video, audio, or image content that is provided to a client device when a bid placed on an advertising impression wins the auction.

After an advertising campaign is configured, advertisements associated with the campaign may be placed in potentially many different contexts. For example, an advertisement may be placed in many potentially many different webpages on potentially many different websites. As another example, an advertisement may be placed in many different presentations of potentially many different web-enabled applications.

In some instances, some of these contexts may be more or less effective than other contexts. For example, an advertisement for an airline may be particularly ineffective if placed on a webpage that includes a news story describing a plane crash. As another example, an advertisement for a beverage may be particularly effective if placed on a webpage that includes a news story describing a heat wave. As yet another example, visual presentation elements associated with an advertisement such as color tones may be more or less appealing depending on the visual context into which the advertisement is placed.

Conventional advertising campaign management techniques facilitate the collection of analytics data regarding campaign performance. However, not all insights about how an ad performs can be generated from quantitative data. In some instances, a user may wish to view an advertisement in the context in which it is presented to an end user at a client device. Analyzing the way in which advertisements in online advertising campaigns appear when actually presented to end users is difficult using conventional advertising campaign management techniques.

Advertisements including creative artwork are served through RTB advertisements inventory to a variety of websites and applications in a number of formats configured by the advertisement agency or campaign manager. Although a user such as a campaign manager can try to cut and paste an advertisement into snapshots of web pages where the advertisement has been known to be served, this is an approximation and not necessarily an accurate depiction of how the advertisement is presented at a client device.

According to various embodiments, techniques and mechanisms described herein may facilitate the capture of images of advertisements presented in the context in which the advertisements are displayed to end users. A campaign management system may communicate external ad servers, and by proxy, external publisher websites or applications. The process of capturing images of placed advertisements may be automated and streamlined. For instance, an advertiser may be presented with a library or archive of the actual context in which digital marketing was displayed. This information may provide insight into the surrounding webpage or application content at the time the advertisement was presented. Alternately, or additionally, this information may provide insights into aesthetic improvements to be made to the creative artwork itself.

According to various embodiments, techniques and mechanisms described herein may facilitate the accurate rendering and aggregation of digital advertisements. For instance, the look and feel of the advertisements in the context of the sites where they are served may be captured. The advertisement system may act as a client device to request a context such as a website or application view. Then, the advertisement system may bid on advertisement placement for the context requested by the client device. When the bid is won, the system may render the page and capture an image of the rendered page. The captured image may be stored in the advertisement campaign management system so that a user such as a campaign manager can view, analyze, and download the screen captures. In this way, the user may be presented with a clear view as to how the advertisement is being viewed and/or the ways in which the campaign might be improved.

In some embodiments, seeing the ad in the page context can lead to changes in the advertising campaign. For example, a viewer may determine that text in the advertisement is sometimes illegible, that the advertisement color scheme clashes with some websites or applications where it is commonly served, that the advertisement content is inappropriate for its context, or that the advertisement content does not match a use case associated with the context in which it is served.

Figure 1:
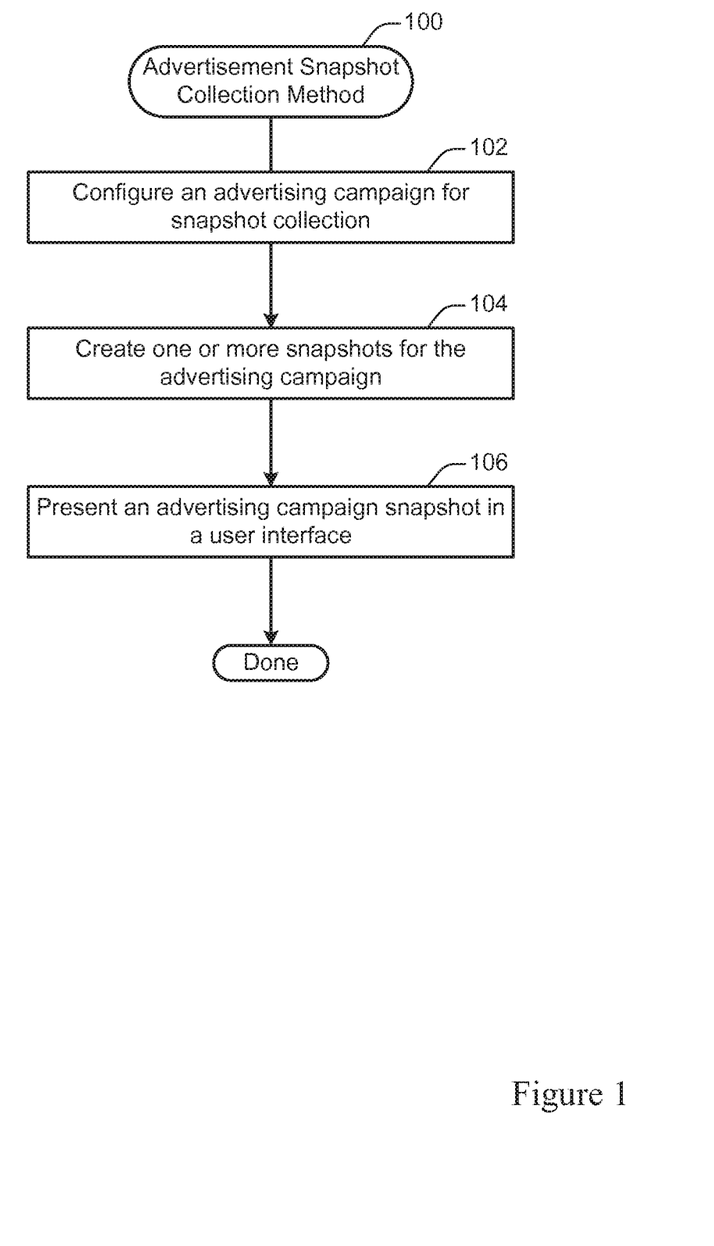
FIG. 1 illustrates an example of an advertisement snapshot collection method, performed in accordance with one or more embodiments.
Figure 2:
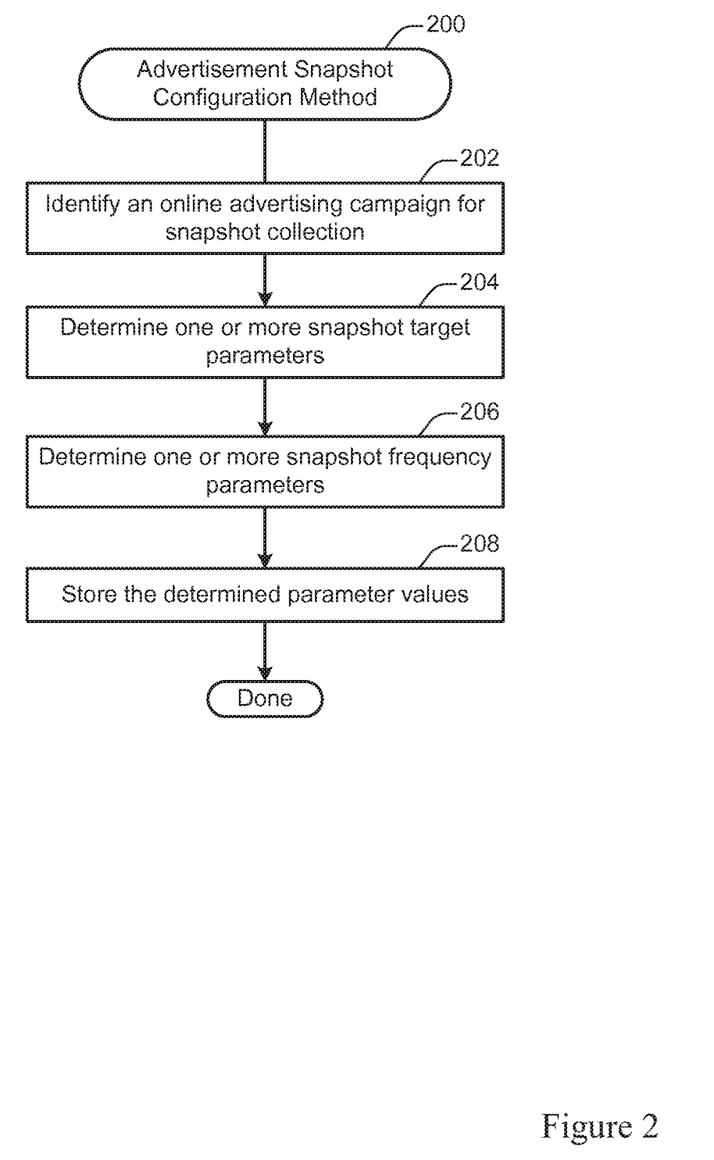
FIG. 2 illustrates an example of an advertisement snapshot configuration method, performed in accordance with one or more embodiments.
Figure 6:
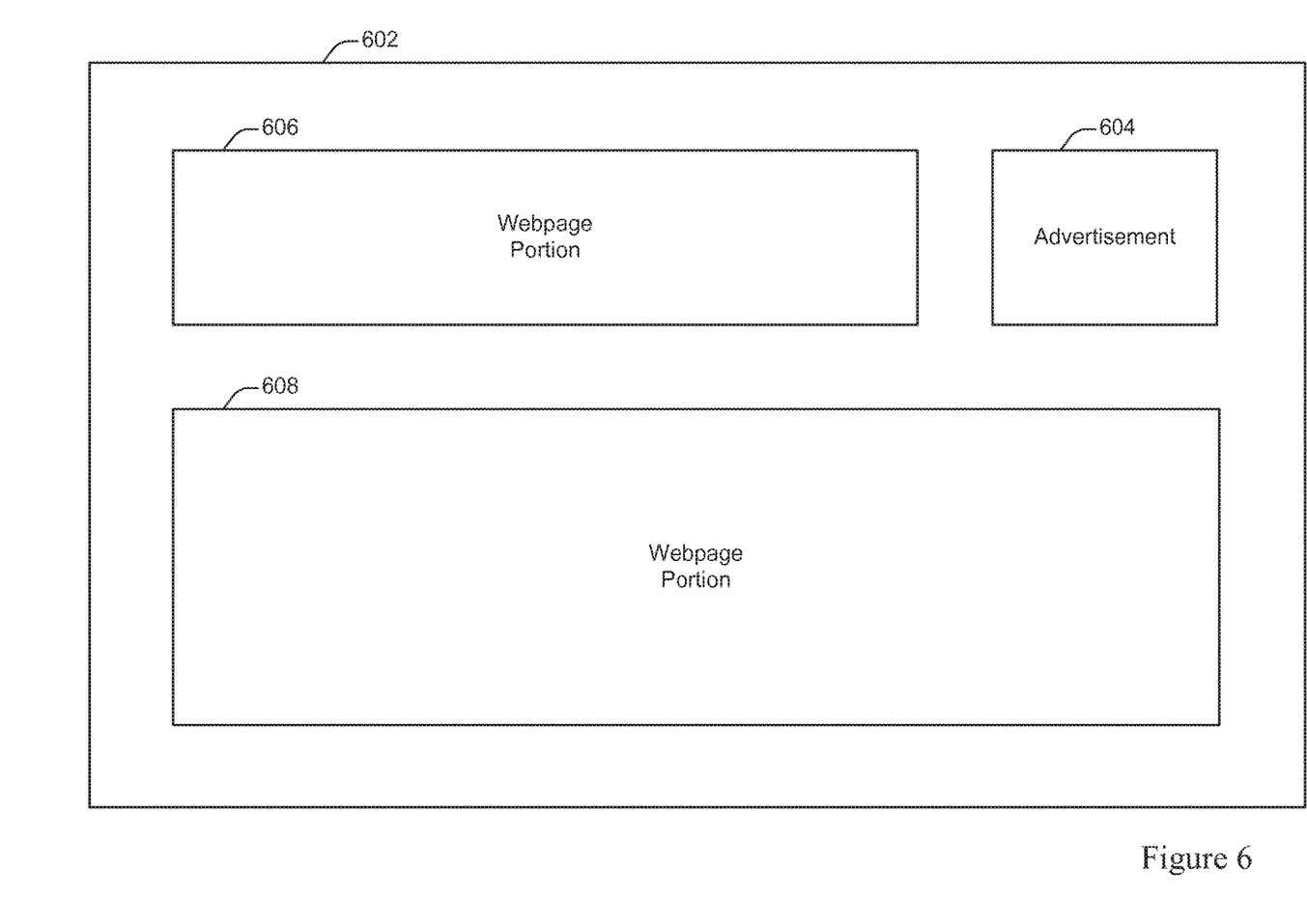
FIG. 6 illustrates a diagram of an advertisement snapshot that may be presented in accordance with one or more embodiments.

FIG. 1 illustrates an example of an advertisement snapshot collection method 100, performed in accordance with one or more embodiments. The method 100 may be performed at a computing device in communication with an advertisement management system configured to provide services for managing one or more advertisement campaigns. Examples of devices and systems in association with the method 100 may be performed are shown in FIGS. 2 and 6.

At 102, an advertising campaign is configured for snapshot collection. According to various embodiments, configuration may be performed when an advertising campaign is initially set up or may be performed later for an advertising campaign that is otherwise configured. Configuration may be performed to designate one or more options such as which websites are to be targeted for snapshot collection, a number of snapshots to be collected, or other such features of a campaign. Techniques for configuring an advertising campaign for snapshot collection are discussed in further detail with respect to FIG. 3.

At 104, one or more snapshots are created for the advertising campaign. According to various embodiments, snapshots may be created by initiating a request for a targeted webpage as a client and then bidding on an advertising opportunity associated with the request as an advertising service provider. When a successful bid is placed, the webpage is served to the client with the advertisement provided by the advertising service provider. Then, the served webpage is rendered by the client, and an image of the rendered webpage is generated. The image may be stored to an advertisement campaign system for presentation in a user interface. Techniques for creating advertisement snapshots are discussed in further detail with respect to FIG. 4.

At 106, an advertising campaign snapshot is presented in a user interface. According to various embodiments, a user interface may be configured to display one or more advertising campaign snapshots created as described with respect to operation 104. Then, the user interface may provide various options for interacting with the snapshots, such as zooming, cropping, saving, or sending snapshots. Techniques for presenting advertising campaign snapshots in a user interface are discussed in further detail with respect to FIG. 5.

FIG. 2 illustrates an example of an advertisement snapshot configuration method 200, performed in accordance with one or more embodiments. The method 200 may be performed at a computing system configured to provide advertising campaign management services. The method 200 may be performed in order to determine one or more parameter values that designate how snapshot collection is to be performed for an online advertising campaign. For instance, an online advertising campaign may involve advertisement placement at potentially many different websites. Accordingly, the campaign may be configured to designate parameters such as which websites and/or webpages are targeted for snapshot collection and at what frequency snapshots are to be collected from the designated websites and/or webpages.

At 202, an online advertising campaign is identified for snapshot collection. According to various embodiments, the online advertising campaign may be accessed by a user such as a campaign manager at a client device in communication with an advertising campaign management system. For instance, the user may provide authentication information to the server and then select a campaign for configuration.

At 204, one or more snapshot target parameters are determined. According to various embodiments, a snapshot target parameter may designate a target context for collecting an advertisement snapshot. For instance, a snapshot target parameter may indicate a website and/or webpage for which an advertisement snapshot is to be collected.

In some embodiments, a snapshot target parameter may be determined at least in part based on user input. For instance, a user may designate a webpage as a target for collecting advertisement snapshots. The user may base this designation on, for instance, a perceived importance of the targeted website to an advertising campaign managed by the user.

In some implementations, a snapshot target parameter may be determined at least in part based on automatic analysis techniques. For instance, an advertising campaign may be analyzed to identify opportunities for productive snapshot collection. Production snapshot collection opportunities may focus on websites in which relatively many advertisements have been placed or are likely to be placed. For example, popular news or weather websites may generate many advertising opportunity bid requests due to high traffic volume and thus be good candidates for snapshot collection.

According to various embodiments, various considerations may affect whether a website is selected for collecting advertisement snapshots. For example, many performance metrics such as click through rate and cost per action are commonly collected for online advertising campaigns. Accordingly, a website that has relatively high or relatively low performance metrics may be targeted for snapshot collection. In the case of a well-performing website, collecting snapshots may help to determine why the campaign is doing well. In the case of an under-performing website, collecting snapshots may help to determine why the campaign is doing poorly.

As another example of a potentially relevant consideration, a website may be targeted for snapshot collection based on cost. For instance, if a website is responsible for a relatively large proportion of the cost associated with an online advertising campaign, then targeting the website for snapshot collection may help to indicate how the budget is being spent.

As yet another example, combinations of parameters may be used to select a website for targeting. For instance, a website that has high traffic but low performance may be a particularly good target since low performance has a relatively larger impact on an advertising campaign for a high traffic website than for a low traffic website.

As still another example, a website may be targeted for snapshot collection based on a comparison of performance metrics for the website between different advertising campaigns. For instance, if one advertising campaign is performing relatively poorly on one website relative to other advertising campaigns, then the website may be targeted for snapshot collection in association with the low-performing campaign to identify a reason for the low performance.

According to various embodiments, the techniques and mechanisms described herein may be used to target online advertising in a variety of contexts. For instance, an advertising campaign management system may include an emulator configured to emulate one or more mobile devices. The system may then collect snapshots of advertisements as they are presented in mobile applications. For instance, the system may transmit a request for an advertisement from within an emulated mobile application and then generated a rendered image of the resulting presentation of the mobile application. Such techniques may also be applied to advertisements presented in other contexts such as online advertisements embedded in desktop applications.

At 206, one or more snapshot frequency parameters are determined. According to various embodiments, a snapshot frequency parameter may be determined at least in part based on user input. For example, a user may indicate a parameter value such as a budget percentage or budget amount to spend on purchasing advertisement inventory for snapshot collection. As another example, a user may indicate a percentage or number of advertisement snapshots to collect. For instance, the user may indicate that a snapshot is to be collected for one in every thousand or ten thousand advertisements placed.

In some implementations, a snapshot frequency parameter may be determined at least in part based on automatic analysis techniques. For instance, webpages may be selected for more or less frequent bid placement based at least in part on any of the factors identified with respect to operation 204.

At 208, the parameter values are stored. In some embodiments, the parameter values may be stored on a storage medium associated with an advertising campaign management system. For instance, the parameter values may be stored in association with information characterizing the online advertising campaign identified in operation 202. Then, the parameter values may be retrieved as part of a procedure for capturing advertisement snapshots, as discussed with respect to FIG. 3.

Figure 3:
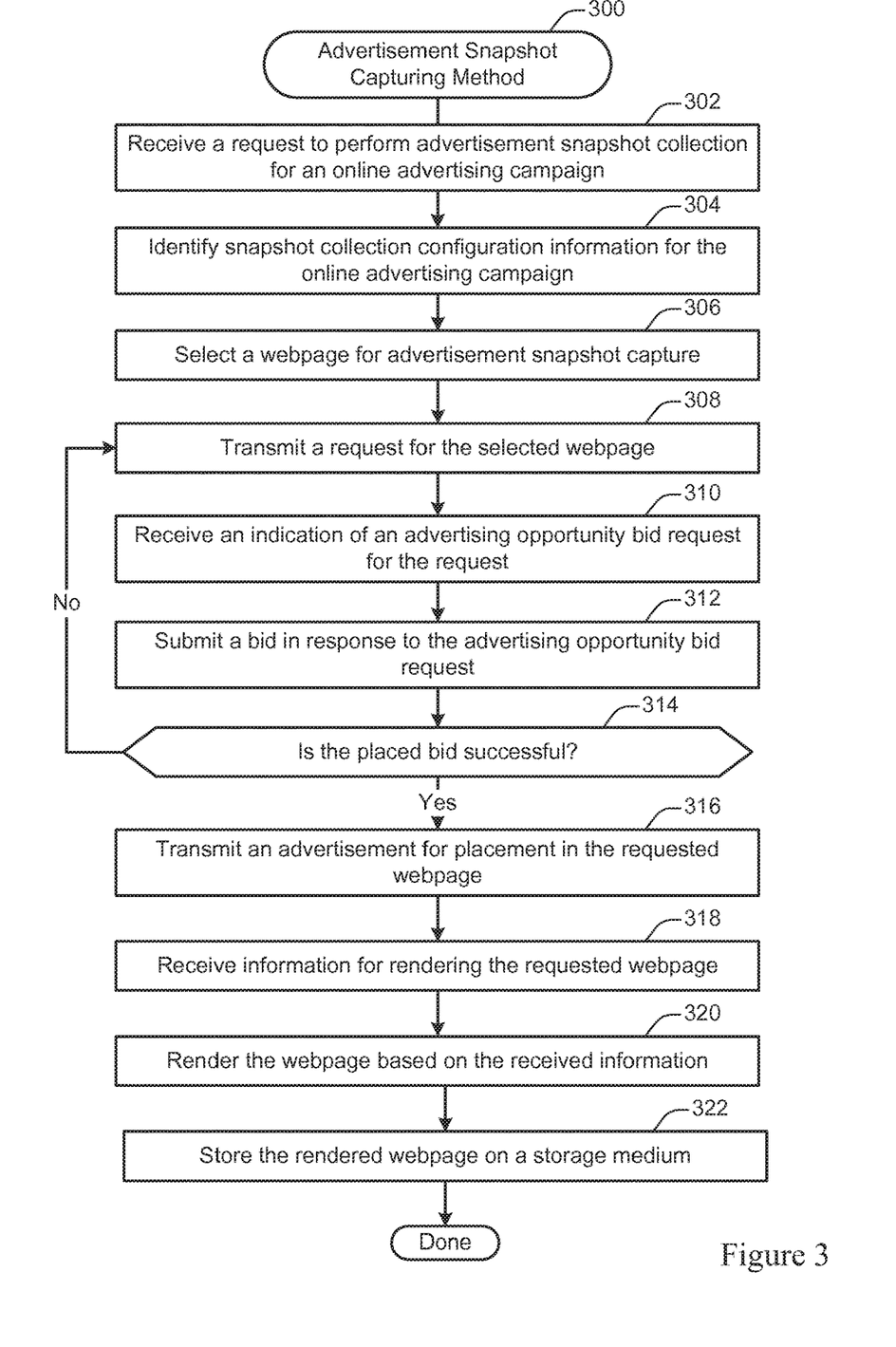
FIG. 3 illustrates an example of an advertisement snapshot capturing method, performed in accordance with one or more embodiments.

FIG. 3 illustrates an example of an advertisement snapshot capturing method 300, performed in accordance with one or more embodiments. The method 300 may be performed at an advertising campaign management system configured to manage an online advertising campaign on behalf of an advertiser. For instance, the method 300 may be performed in conjunction with one or more other procedures for managing an advertising campaign.

At 302, a request to perform advertisement snapshot collection for an online advertising campaign is received. In some embodiments, the method 300 may be performed continually, at scheduled times, upon request, or periodically. For instance, the method 300 may be performed in accordance with the frequency parameters as discussed with respect to operation 206 in FIG. 2.

At 304, snapshot collection configuration information for the online advertising campaign is identified. According to various embodiments, the snapshot collection configuration image may be identified by retrieving the information generated in association with the advertisement snapshot configuration method 200 discussed with respect to FIG. 2. For instance, the configuration information may be identified by transmitting an indication of the online advertising campaign discussed with respect to operation 302 to a server or storage system configured to store configuration information.

At 306, a webpage is selected for advertisement snapshot capture. According to various embodiments, the webpage may be selected based on snapshot target parameters and/or snapshot frequency parameters included in the snapshot collection configuration information. As discussed with respect to FIG. 2, this information may designate webpages of which snapshots are to be collected and indicate a frequency for collecting snapshots from the targeted pages.

At 308, a request for the selected webpage is transmitted. In some embodiments, the request may be transmitted to a web server configured to provide access to the requested webpage. For instance, a domain name associated with the requested webpage may be used to query a DNS server, which may provide an IP address for accessing the web server. Then, a request message may be transmitted over a network such as the Internet to the identified web server. The request may indicate the specific webpage requested and identify an address for providing a response to the request.

At 310, an indication of an advertising opportunity bid request is received. According to various embodiments, the advertising opportunity bid request may be received in a message transmitted by a real time bid exchange. A real time bid exchange is a system configured to provide real time auctions to purchase advertising inventory on webpages provided to client devices. When the webpage requested transmitted at operation 308 is received by the web server, the web server may transmit to the real time bid exchange information about the webpage request. This information may then allow the real time bid exchange to create an auction for advertising opportunities on the requested webpage. The real time bid exchange may then transmit advertising opportunity bid request messages to advertising campaign management systems, which may then transmit bid messages to bid on the advertising opportunity.

In some implementations, the advertisement management system may include an identifier in the request for the webpage transmitted at operation 308. Then, when the system receives the advertising opportunity bid request at operation 310, the system may determine that the bid request corresponds to the webpage request by identifying the identifier as being included in the bid request message.

At 312, a bid is submitted in response to the advertising opportunity bid request received at operation 310. In some embodiments, the bid may be transmitted to the real time bid exchange. In some instances, the value of the placed bid may be consistent with a bidding strategy associated with the online advertising campaign. Alternately, the value of the placed bid may be set higher or lower than the normal bidding strategy. For example, the value of the placed bid may be set relatively higher in order to achieve a greater probability of successful bid placement.

At 314, a determination is made as to whether the placed bid is successful. In some embodiments, the bid placed as discussed in operation 312 may be successful if it is the highest bid than the other bids received by the real time bid exchange in response to the advertising opportunity bid request received at operation 310, which may have also been received by other entities that submitted bids.

According to various embodiments, the determination at 314 may be made at least in part based on communications received or not received from a real time bid exchange. For instance, after the bid is placed as discussed in operation 312, the real time bid exchange may transmit a message if the bid is successful. Alternately, or additionally, the real time bid exchange may transmit a message if the bid is not successful. If the placed bid is not successful in winning the auction, the method may continue to select webpages for advertisement snapshot capture as discussed with respect to operation 308.

At 316, an advertisement is transmitted for placement in the requested webpage. In some embodiments, the advertisement may be transmitted to the real time bid exchange, which may provide the advertisement to the web server for including in a webpage provided in response to the request submitted as discussed in operation 308. Alternately, the advertisement may be transmitted to a web server responsible for providing access to the requested webpage.

At 318, information for rendering the requested webpage is received. According to various embodiments, the information for rendering the requested webpage may include, for instance, one or more messages that contain content such as computer programming code and/or markup. For example, the webpage may be generated as an HTML object that may include computer programming code written in a scripting language such as JavaScript.

In some implementations, the information received at operation 318 may be received from the web server to which the request for the webpage was transmitted at operation 308. The information may include the advertisement transmitted at operation 316.

At 320, the webpage is rendered based on the received information. According to various embodiments, the webpage may be rendered by any suitable program for generating an image of the webpage based on the information received at operation 318. For example, the webpage may be rendered by a web browser. As another example, the webpage may be rendered by a server-side rendering program such as PhantomJS or Wkhtmltoimage, both freely available open source toolkits.

In some embodiments, rendering the webpage may involve analyzing the information received at operation 318 to produce an image. The image may include visual components provided by the web server that transmitted the information as discussed at operation 318. The image may also include the advertisement transmitted at operation 316 placed in its appropriate location within the page. In this way, the advertisement may be displayed in its natural context in the same manner in which it might be presented to an advertisement audience member.

At 322, the webpage image is stored in a storage system. According to various embodiments, the webpage image may be stored in a storage system associated with the online advertising campaign management system. For instance, the webpage image may be stored in association with the online advertising campaign discussed with respect to operation 302 so that the image may later be retrieved for presentation in a user interface. Techniques for presenting an advertisement snapshot are discussed in further detail with respect to FIGS. 4, 6, and 7.

Figure 4:
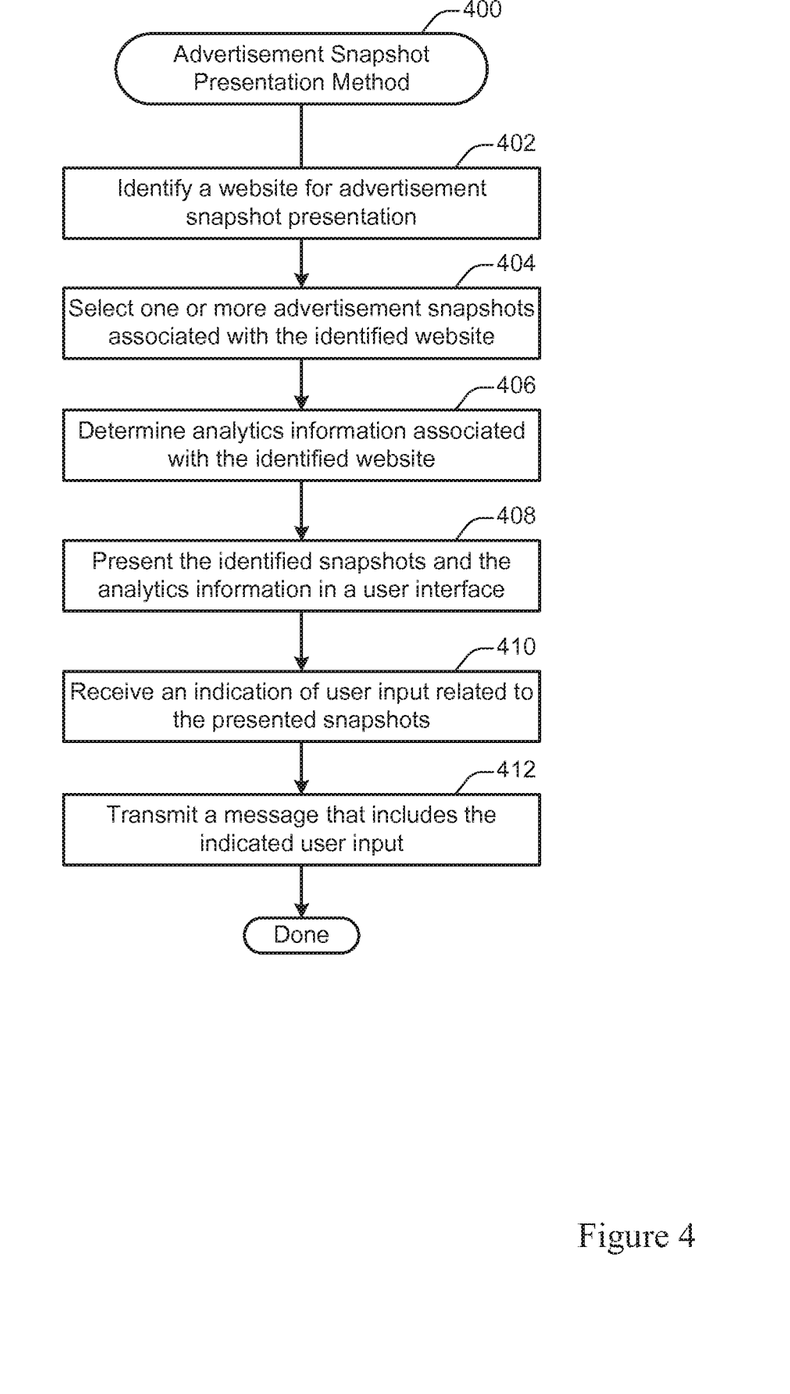
FIG. 4 illustrates an example of an advertisement snapshot presentation method, performed in accordance with one or more embodiments.

FIG. 4 illustrates an example of an advertisement snapshot presentation method 400, performed in accordance with one or more embodiments. The method 400 may be performed at a client device in communication with an advertising campaign management system. The method 400 may be performed in order to allow a user to view and manipulate advertisement snapshots captured as discussed with respect to FIG. 4.

At 402, a website is identified for advertisement snapshot presentation. According to various embodiments, a website may be identified via any of various techniques. For example, a website may be identified via user input. In this case, a user accessing an advertising campaign management system may indicate one or more websites for which advertisement snapshots are to be presented. As another example, an advertising campaign may be identified based on account authentication information. Then, a website for which a snapshot has been collected in association with the identified account may be automatically identified by the system.

At 404, one or more advertisement snapshots associated with the identified website is selected. According to various embodiments, an advertisement snapshot may be selected by transmitting a message to a snapshot management system. The message may indicate the website identified at operation 402 and include a request for snapshots associated with the identified website.

In some embodiments, more than one snapshot associated with the website may be available. In this case, the snapshots to display may be strategically selected based on any of a variety of factors that may include, but are not limited to: user input, timestamp data indicating when snapshots were collected, similarity data identifying similarities or differences between the snapshots, or any other relevant information. For example, the snapshots selected may be drawn primarily from recently collected snapshots. As another example, similarity data may be used to present snapshots drawn from different webpages or snapshots having different content. In this way, a user may be presented with a relatively broader cross-section of advertisement contexts.

At 406, analytics information associated with the identified website is determined. In some embodiments, analytics information may be determined by retrieving the analytics information from an advertising management system. For instance, the advertising management system may provide advertising-related services such as advertisement placement, web traffic analysis, and snapshot management for the website. The analytics information may be retrieved from the advertising management system by transmitting a message to the advertising management system identifying the website.

Figure 7:
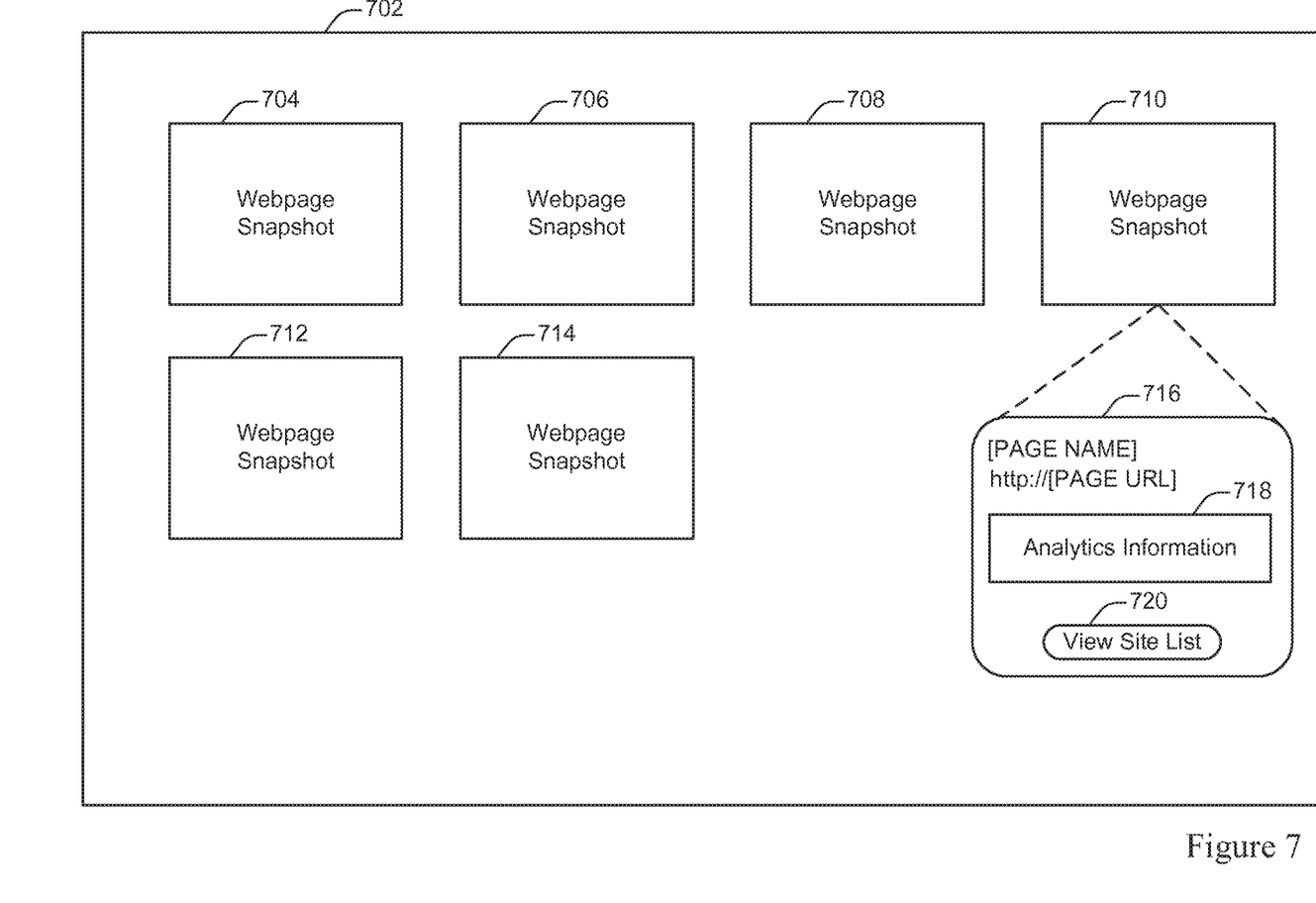
FIG. 7 illustrates a diagram of a user interface that may be presented in accordance with one or more embodiments.

At 408, the identified snapshots and the analytics information are presented in a user interface. According to various embodiments, presenting the snapshots and analytics information in the user interface may involve transmitting an instruction to a client device configured to present such an interface. For instance, a webpage including the user interface may be loaded in a web browser at a client device. An example of a user interface for presenting snapshots and analytics information is shown in FIG. 7.

At 410, an indication of user input related to the presented snapshots is received. According to various embodiments, the user input may include a request to delete, save, send, or otherwise manipulate a file associated with a snapshot. Alternately, or additionally, the user input may include a request to zoom in, zoom out, crop, edit, or otherwise manipulate a snapshot image.

At 412, a message that includes the indicated user input is transmitted. According to various embodiments, the message may be transmitted to different recipients depending on factors such as the configuration of the system and the location of the computing system on which the method 400 is performed. For example, the message may be transmitted to a server configured to manager advertisement snapshots. As another example, the message may be transmitted to a storage medium at the computing device configured to store user input. For instance, user input may be stored for updating the representation displayed in the user interface.

Figure 5:
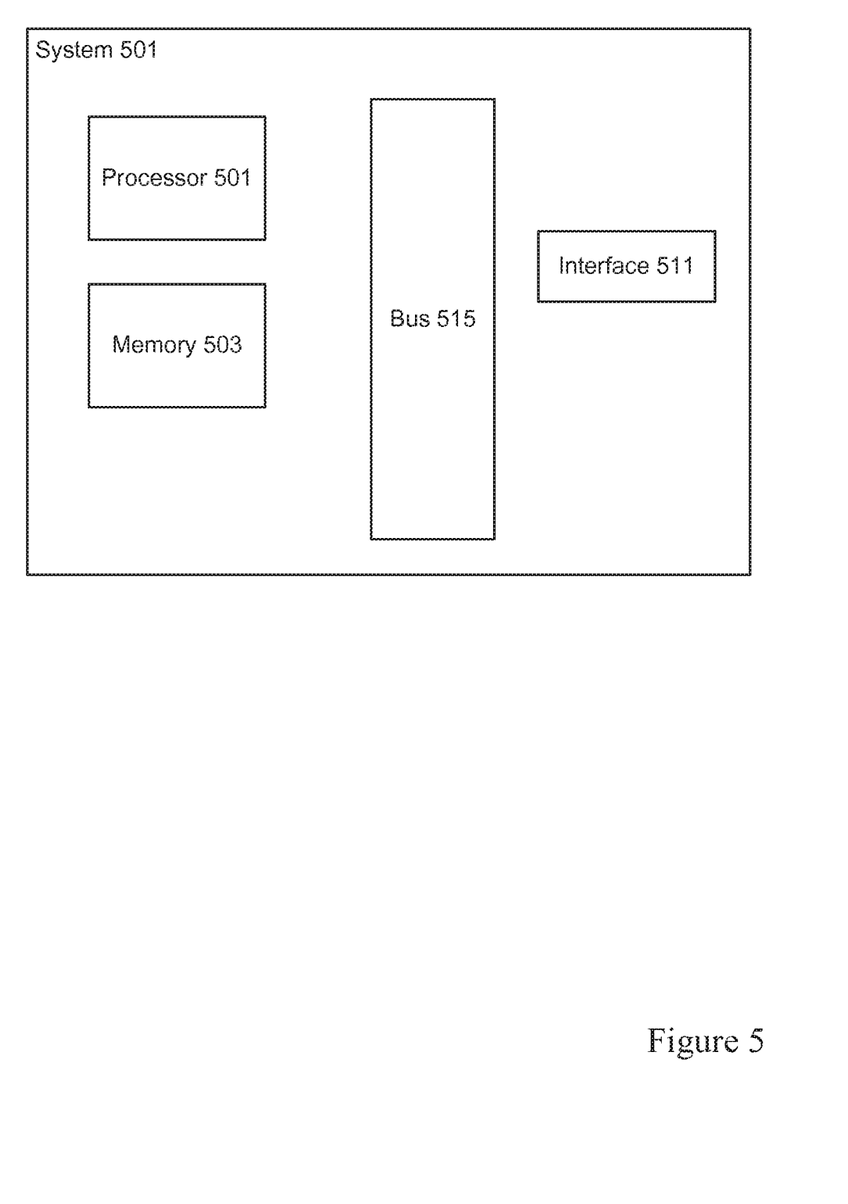
FIG. 5 illustrates an example of a computing device, configured in accordance with one or more embodiments.

FIG. 5 illustrates one example of a computing device. According to particular embodiments, a system 500 suitable for implementing particular embodiments of the present invention includes a processor 501, a memory 503, an interface 511, and a bus 515 (e.g., a PCI bus or other interconnection fabric) and operates as server, client device, or any other device or service described herein. Various specially configured devices can also be used in place of a processor 501 or in addition to processor 501. The interface 511 is typically configured to send and receive data packets over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. Although a particular server is described, it should be recognized that a variety of alternative configurations are possible.

FIG. 6 illustrates a diagram of an advertisement snapshot that may be presented in accordance with one or more embodiments. The advertisement snapshot image 602 shown in FIG. 6 is an example of the type of image that may be collected as discussed herein. The snapshot image 602 may be collected in order to present an advertisement as it appears in an actual webpage presented at a client device.

According to various embodiments, the snapshot may be stored in a digital image format. For instance, a digital image format such as the Portable Network Graphics (PNG) image format, the Joint Photographic Experts Group (JPEG, JPG) image format, or any other suitable format for storing digital images may be used. In particular embodiments, an image format may be strategically selected based on considerations such as desired image resolution, desired file size, compression capabilities, and/or the characteristics of the digital snapshot management system.

According to various embodiments, a snapshot image may include an advertisement and one or more visual display portions. For instance, the snapshot image 602 includes the advertisement 604 and the webpage portions 606 and 606. By viewing the image 602, a user may view a realistic portrayal of an actual presentation of the advertisement 606 on a webpage. For instance, the snapshot image 602 may correspond to a news or weather page, and the webpage portions 606 and 608 may correspond to webpage components such as headlines, articles, images, or other content associated with the webpage. The advertisement 604 may correspond to an advertisement provided by the advertising campaign management system after submitting a winning bid to a bid request for bids to place an advertisement on the webpage 602. It should be noted that webpages may have many different features and configurations, and the webpage configuration shown in FIG. 6 is only one example of the many types of webpage configurations that may appear in snapshot images.

FIG. 7 illustrates a diagram of a user interface 702 that may be presented in accordance with one or more embodiments. The user interface 702 may be presented in order to allow a user to view, edit, store, or otherwise manipulate webpage snapshots. For instance, the user interface 702 may be generated as discussed with respect to FIG. 6.

In FIG. 7, a user interface 702 presents several webpage snapshots, including the snapshots 704, 706, 708, 710, 712, and 714. The user interface 702 includes an analytics dialog 716. According to various embodiments, an analytics dialog may be presented for different webpages or webpage snapshots, for instance by clicking on a webpage snapshot or otherwise selecting a webpage snapshot.

In some implementations, an analytics dialog may provide provides various information and opportunities related to a selected webpage. For instance, the analytics dialog 716 indicates a webpage name and URL associated with the webpage from which the webpage snapshot 710 was taken. The analytics dialog 716 also includes a "View Site List" button 720. The button 720 may be used to view websites associated with an advertising campaign, such as websites for which snapshot collection has been configured.

According to various embodiments, an analytics dialog may display analytics information about a webpage. For instance, the analytics dialog 716 includes the analytics information window 718. The analytics information window may display information such as web traffic analysis, visitor demographics information, or other types of collected data associated with the selected website.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:
generating via a processor a first message requesting a webpage, the first message including a designated message identifier, the designated message identifier being associated with a designated advertisement;
transmitting the first message via a communications interface to a webpage content server configured to serve the requested webpage;
receiving from a bid server an advertising opportunity bid request for bids on a real-time auction to place an advertisement on the requested webpage, the advertising opportunity bid request including the designated message identifier;

generating a second message to place a bid to transmit the designated advertisement for presentation on the requested webpage;
transmitting the second message to the bid server via the communications interface;
determining that the bid placed via the second message won the real-time auction;
receiving information for rendering the requested webpage from the webpage content server, the information including a link to the designated advertisement;
rendering the requested webpage such that the designated advertisement appears on the requested webpage; and
storing an image of the rendered webpage on a storage medium, the image of the rendered webpage including the designated advertisement.

2. The method recited in claim 1, the method further comprising:
transmitting a third message to a client device, the third message including the image of the rendered webpage for presentation on the client device.

3. The method recited in claim 2, wherein the third message includes analytics information characterizing web traffic associated with the requested webpage.

4. The method recited in claim 1, the method further comprising:
when the placed bid is successful, transmitting a third message including an advertisement for placement in the requested webpage.

5. The method recited in claim 4, wherein the image of the rendered webpage includes a first portion generated based on instructions provided by the webpage content server and a second portion generated based on information provided by the link to the designated advertisement.

6. The method recited in claim 1, wherein the image of the rendered webpage is collected in accordance with online advertising campaign configuration instructions, the online advertising campaign configuration instructions including one or more parameter values for executing an online advertising campaign on behalf of an advertiser.

7. The method recited in claim 6, wherein the online advertising campaign configuration instructions include a first instruction for rendered webpage collection, the first instruction designating the requested webpage.

8. The method recited in claim 7, wherein the first instruction indicates a frequency for collecting images of the requested webpage.

9. The method recited in claim 1, wherein the requested webpage is rendered via a server-side webpage rendering software.

10. A system comprising:
a processor configured to:
generate a first message requesting a webpage and including a designated message identifier associated with a designated advertisement,
receive from a bid server an advertising opportunity bid request for bids on a real-time auction to place an advertisement on the requested webpage,
generate a second message to place a bid to transmit the designated advertisement for presentation on the requested webpage,
determine that the bid placed via the second message won the real-time auction, and
render the requested webpage such that the designated advertisement appears on the requested webpage;
a communications interface configured to:
transmit the first message to a webpage content server configured to serve the requested webpage,
transmit the first message to the bid server, and
receive information for rendering the requested webpage from the webpage content server, the information including a link to the designated advertisement; and
a storage medium configured to store an image of the rendered webpage on a storage medium, the image of the rendered webpage including the designated advertisement.

11. The system recited in claim 10, wherein the communications interface is further configured to transmit a third message to a client device, the third message including the image of the rendered webpage for presentation on the client device.

12. The system recited in claim 11, wherein the third message includes analytics information characterizing web traffic associated with the requested webpage.

13. The system recited in claim 10, wherein the communications interface is further configured to transmit, when the placed bid is successful, a third message including an advertisement for placement in the requested webpage.

14. The system recited in claim 13, wherein the image of the rendered webpage includes a first portion generated based on instructions provided by the webpage content server and a second portion generated based on information provided by the link to the designated advertisement.

15. The system recited in claim 10, wherein the image of the rendered webpage is collected in accordance with online advertising campaign configuration instructions, the online advertising campaign configuration instructions including one or more parameter values for executing an online advertising campaign on behalf of an advertiser.

16. The system recited in claim 15, wherein the online advertising campaign configuration instructions include a first instruction for rendered webpage collection, the first instruction designating the requested webpage.

17. The system recited in claim 16, wherein the first instruction indicates a frequency for collecting images of the requested webpage.

18. One or more non-transitory computer readable media having instructions stored thereon for performing a method, the method comprising:
generating via a processor a first message requesting a webpage, the first message including a designated message identifier, the designated message identifier being associated with a designated advertisement;
transmitting the first message via a communications interface to a webpage content server configured to serve the requested webpage;
receiving from a bid server an advertising opportunity bid request for bids on a real-time auction to place an advertisement on the requested webpage, the advertising opportunity bid request including the designated message identifier;
generating a second message to place a bid to transmit the designated advertisement for presentation on the requested webpage;
transmitting the second message to the bid server via the communications interface;
determining that the bid placed via the second message won the real-time auction;
receiving information for rendering the requested webpage from the webpage content server, the information including a link to the designated advertisement;
rendering the requested webpage such that the designated advertisement appears on the requested webpage; and storing an image of the rendered webpage on a storage medium, the image of the rendered webpage including the designated advertisement.

19. The one or more non-transitory computer readable media recited in claim 18, wherein the method further comprises:
transmitting a third message to a client device, the third message including the image of the rendered webpage for presentation on the client device.

20. The one or more non-transitory computer readable media recited in claim 19, wherein the third message includes analytics information characterizing web traffic associated with the requested webpage.

* * * * *

UNITED STATES PATENT AND TRADEMARK OFFICE
CERTIFICATE OF CORRECTION

PATENT NO. : 10,290,026 B2
APPLICATION NO. : 15/398889
DATED : May 14, 2019
INVENTOR(S) : Douglas Smith Page 1 of 1

It is certified that error appears in the above-identified patent and that said Letters Patent is hereby corrected as shown below:

On the Title Page

Change "(71) Applicant: Amboee, Inc., Redwood City, CA (US)" to -- (71) Applicant: Amobee, Inc., Redwood City, CA (US) --.

Signed and Sealed this
Tenth Day of September, 2019

Andrei Iancu
*Director of the United States Patent and Trademark Office*